United States Patent
Giangrasso

(10) Patent No.: US 7,892,800 B2
(45) Date of Patent: Feb. 22, 2011

(54) COMPOSITE SUPPORT MATERIAL FOR BACTERIA

(75) Inventor: Antonio Giangrasso, Nürnberg (DE)

(73) Assignee: Pfleiderer Water Systems GmbH, Neumarkt (DE)

(*) Notice: Subject to any disclaimer, the term of this patent is extended or adjusted under 35 U.S.C. 154(b) by 974 days.

(21) Appl. No.: 10/581,116

(22) PCT Filed: Dec. 22, 2004

(86) PCT No.: PCT/EP2004/014627

§ 371 (c)(1), (2), (4) Date: Apr. 23, 2007

(87) PCT Pub. No.: WO2005/061594

PCT Pub. Date: Jul. 7, 2005

(65) Prior Publication Data

US 2007/0202176 A1    Aug. 30, 2007

(30) Foreign Application Priority Data

Dec. 22, 2003  (DE) .............................. 103 60 465

(51) Int. Cl.
  C12N 11/00    (2006.01)
  C12N 11/14    (2006.01)
  C12N 11/02    (2006.01)
  C12N 11/08    (2006.01)
  C02F 3/34     (2006.01)
  C02F 3/00     (2006.01)

(52) U.S. Cl. .................... 435/174; 435/176; 435/177; 435/180; 435/262; 210/601

(58) Field of Classification Search ............... None
See application file for complete search history.

(56) References Cited

U.S. PATENT DOCUMENTS

| 4,620,931 | A | 11/1986 | Hirata et al. |
| 4,664,803 | A | 5/1987 | Fuchs et al. |
| 5,019,311 | A | 5/1991 | Koslow |
| 6,043,067 | A | 3/2000 | Lihme et al. |
| 6,818,579 | B2 | 11/2004 | Giangrasso |
| 7,195,233 | B2* | 3/2007 | Giangrasso ............... 261/122.1 |

FOREIGN PATENT DOCUMENTS

| DE | 3032869 A1 | 4/1982 |
| DE | 69024984 | 3/1996 |
| DE | 69122393 | 10/1996 |
| DE | 10022798 C2 | 11/2001 |
| EP | 1160206 A1 | 12/2001 |
| GB | 1412589 | 11/1975 |
| WO | WO-01/85644 A1 | 11/2001 |

OTHER PUBLICATIONS

CA Abstract No. AN 89:94657, "Decolorization of colored waste water."
WPIDS Abstract AN 1995-117587, "Carrier for immbolising microorganisms—is obtd. from inorganic and/or organic particles coated with hydrophilic resin."
Examination Report dated Sep. 9, 2004 from the German Patent and Trademark Office for application No. DE 103 60 465.0.
Anonymous, "newfloat/newpond HDPE-Schüttgut für Bakterienansiedlung," Pfleiderer Water Systems, retrieved online from http://www.pfleiderer-water.com/default.asp?V_DOC_ID=2408>, Jul. 29, 2005.
International Search Report for Application No. PCT/EP2004/014627, dated Sep. 7, 2005.

* cited by examiner

*Primary Examiner*—David M Naff
(74) *Attorney, Agent, or Firm*—McCarter & English, LLP

(57) ABSTRACT

The present invention relates to a composite material made of non-metallic inorganic grains and plastics particles. The composite material is particularly suitable as a carrier material for bacteria for use in sewage treatment plants. It is characterized by a large surface suitable for the colonization of bacteria and also by a density which allows the composite material to be suspended in the medium present in the sewage treatment plant. A further advantage of the composite material according to the invention is the property that due to the surface structure of the composite material adhering sludge and saturated bacteria can fall off its surface, and this thus allows regeneration of the material.

14 Claims, No Drawings

COMPOSITE SUPPORT MATERIAL FOR BACTERIA

RELATED APPLICATIONS

This application is a 35 U.S.C. §371 filing of International Application Number PCT/EP2004/014627 filed Dec. 22, 2004, which claims priority to German Application 103 60 465.0, filed Dec. 22, 2003 in Germany. The contents of these applications are hereby incorporated by reference in their entireties.

FIELD OF THE INVENTION

The present invention relates to a composite material made of non-metallic inorganic grains and plastics particles, which is particularly suitable as a carrier material for bacteria. A preferred field of application for such carrier materials is in the biological stages of sewage treatment plants.

BACKGROUND

In most biological processes used today for sewage treatment, it is primarily the ability of microorganisms to oxidise organic toxins with oxygen of which use is made. For the operation of sewage treatment plants, therefore, the provision of a carrier material which offers bacteria favourable conditions for life in such plants is of great interest. In this regard, it is of decisive importance, on the one hand, that the largest possible surface be provided on which the bacteria can form colonies whilst, on the other hand, it is advantageous if the carrier material has a specific density which corresponds to that of the liquid to be treated, so that the carrier material becomes suspended in the liquid and can be circulated by existing currents. A further criterion for an advantageous bacteria carrier is the presence of a sufficiently smooth surface which enables the sludge containing the saturated bacteria building up on the material to fall off the carrier from time to time, providing room for new bacterial growth and thus for regeneration of the treatment unit.

It is known to use larva and/or shingle as carriers for bacteria in a fixed bed filter. This variant, however, is distinguished by the disadvantage that the carrier is denser than water and is therefore not capable of becoming suspended. A further disadvantage is that a high level of pressure loss occurs. Also disadvantageous for the use of these materials as bacteria carriers in sewage treatment plants is the fact that the contamination problem is not satisfactorily solved in this case, and that carrier materials of this type have too small a surface area.

Furthermore, the use of plastics carriers, particularly based on moulded bodies, in sewage treatment plants is known. These are distinguished, however, by a small surface area of up to a maximum of 600 m²/m³, and their partial tendency to float.

Carriers based on ceramics are also used, although these are also unsatisfactory, since on the one hand they are not capable of becoming suspended and, on the other hand, they are too expensive to produce.

SUMMARY OF THE INVENTION

With regard to the aforementioned prior art, the present invention is based on the aim of providing a carrier material for bacteria for use in sewage treatment plants and having a high specific surface area for colonisation by bacteria, and which is able to become suspended in the aqueous medium in a treatment plant and which, by means of a sufficiently smooth surface, enables sludge and saturated bacteria to fall off during operation.

This aim is fulfilled according to the invention by the composite material according to claim 1. Preferred embodiments of the composite material are described in the dependent claims 2 and 3.

The present invention also relates to the use of the composite material according to the invention as a carrier material for bacteria. This aspect of the present invention is described in claims 4 to 6.

The present invention further relates to a method for manufacturing the composite material according to the invention. This method is described in claims 7 and 8.

DETAILED DESCRIPTION OF THE INVENTION

1. Definitions 1.1 Where not expressly stated, the present description uses the terms "pore", "porous" and "porosity" in the sense of open porosity. These terms therefore relate to pores that are accessible from outside.

1.2 The "specific surface area" is determined by nitrogen absorption using the BET method as per DIN 66131.

1.3 The accessible (open) "porosity" is determined using mercury porosimetry as per DIN 66133.

1.4 The "grain size" is determined by sieve analysis as per DIN 53477.

1.5 The "porosity" is defined by Formula (I), $$P = V \times 100\% / (1/S + V) \qquad (I)$$

where P is the porosity [%], S is the true density [g/cm³] and V is the specific pore volume [cm³/g].

1.7 The "specific pore volume" and the "pore size" are determined with mercury porosimetry as per DIN 66133. When measuring the specific pore volume by mercury porosimetry, the quantity of mercury penetrating into the sample is determined together with the necessary pressure. By means of these data, using the known capillary forces of mercury, the pore volume and pore size are found. Based on the fact that mercury can only penetrate into the accessible pores, only the open porosity is detected during the measurement.

1.8 The "true density" (solid density) is obtained by measurement as per DIN 66137-2.

2. Non-Metallic Inorganic Material

The non-metallic inorganic material used in the composite material according to the invention has the task of providing a sufficiently large surface area for colonisation by bacteria. Of decisive importance to the suitability for colonisation by bacteria, apart from the size of the specific surface area, is its structure. It is, in particular, preferable for colonisation by bacteria if the non-metallic inorganic material has pores that are accessible from outside and are not too small, in order that a good degree of material exchange with the surrounding medium is ensured.

According to the invention, the requirements set out above are met by an inert material having the following characteristics:

a specific surface area in the range of 10,000 m²/m³ to 1,000,000 m²/m³, a porosity in the range of 10% to 80%, pores of which at least 50% have a size in the range of 0.1 μm to 1000 μm, and grains, more than 50% of which have a size in the range of 0.1 mm to 50 mm Preferred are materials whose specific surface area is in the range of 25,000 $m^2/m^3$ and 500,000 $m^2/m^3$. Particularly preferred are materials with specific surface areas in the range of 100,000 $m^2/m^3$ to 500,000 $m^2/m^3$. Similarly, materials are advantageously used in which at least 80% of the pores lie within a size range of 0.5 μm and 100 μm, and preferably between 5 μm and 50 μm. It is also preferable that 70% of the material has a grain size in the range of 0.1 mm to 50 mm and particularly preferably between 1 mm and 20 mm. Also preferable is the use of a material whose (open) porosity is in the range of 40% to 80% and preferably in the range of 50% to 70%.

The non-metallic inorganic material (similarly to the plastics material described below) also distinguishes itself in that it is inert in the surrounding medium in which it is used as a carrier material for bacteria (i.e. typically in an aqueous medium), that is that it is neither soluble nor does it undergo chemical reactions.

The chemical composition of the non-metallic inorganic material is not stipulated in greater detail, provided it fulfils the above requirements. The following non-metallic inorganic materials may, for instance, be used in accordance with the present invention: zeolites, activated charcoal, clay granulates, porous silicate materials.

A particularly preferred material is disclosed in DE 100 22 798.

Manufacturing of the non-metallic inorganic materials according to the invention takes place using conventional techniques.

Suitable grain sizes for the non-metallic inorganic material are obtained by grinding and/or sieving.

3. Plastics Particles

The plastics particles to be used according to the present invention have the purpose, on the one hand, through their combination with the non-metallic inorganic material of enabling a specific density of the composite material which corresponds to that of the surrounding medium, such that the composite material is capable of being suspended in this medium.

On the other hand, the plastics material with its surface which is smooth compared to the non-metallic inorganic material, enables detachment of the sludge and saturated bacteria from the surface of the composite material.

In order to fulfil this aim, it is advantageous if the plastics particles have a specific density in the range of 0.6 $g/cm^3$ to 1.2 $g/cm^3$, preferably 0.9 $g/cm^3$ to 1.1 $g/cm^3$, and a specific surface area in the range of 50 $m^2/m^3$ to 1000 $m^2/m^3$, preferably 100 $m^2/m^3$ to 500 $m^2/m^3$, and that, of the plastics particles, more than 50% have a particle size in the range of 5 mm to 100 mm, and preferably 8 mm to 60 mm.

Essentially every plastics material is suitable for use according to the present invention, provided that particles which fulfil the above criteria may be made from such material. Typical plastics that are suitable for use according to the present invention are PE (polyethylene), PP (polypropylene), PS (polystyrene), PU (polyurethane), ABS (acrylonitrile-butadiene-styrene) and PVC (polyvinyl chloride).

The shape of the plastics particles is not specified, and sphere, disk, lens or cube-shaped particles may be used, as well as mixed shapes and entirely irregularly-shaped particles.

The size and shape of the particles is determined by the manufacturing process.

4. Composite Materials

An essential aspect of the composite material is the presence both of grains of the non-metallic inorganic material and of plastics particles. The relative mass ratio of these components lies typically in the range (non-metallic inorganic material: plastics particles) of 85:15 to 15:85. The exact mass ratio of the components is readily determined from the desired specific density of the composite material and from the specific density of the components, and may be easily determined by a person skilled in the art.

The desired specific density of the composite material is determined, when used as a bacterial carrier material in sewage treatment plants, by the specific density of the medium in the treatment plant. With regard to the ability of the particles to become suspended, it may be advantageous to select the specific density of the composite material such that it deviates by no more than 20% from the specific density of the medium. Still further preferred are composite materials whose specific densities deviate by no more than 10% from that of the medium. Particularly preferable are composite materials with a specific density which lies in the range of ±15% of the specific density of the medium. This means, for instance, for media with a specific density of 1 $g/cm^3$, that the specific density of the composite material lies in the range of 0.8 $g/cm^3$ to 1.2 $g/cm^3$, preferably 0.9 $g/cm^3$ to 1.1 $g/cm^3$ and particularly preferably in the range of 0.95 $g/cm^3$ to 1.05 $g/cm^3$.

The components of the composite material are advantageously bound to each other such that on use (e.g. for operation of a sewage treatment plant), they are able to withstand the mechanical loads arising there. The manner of binding of the components is not specified in greater detail and may include both pressing during melting of the plastics particles, and cementing of the components.

The spatial arrangement of the components within the composite material is also not specified in greater detail. Thus, in the composite material according to the invention, apart from contact sites between grains of non-metallic inorganic material and plastics particles, contact sites between non-metallic inorganic grains among themselves and/or between plastics particles among themselves may exist.

It is also preferable that the components of the composite material are selected and combined with each other such that the specific surface area of the composite material lies in the range of 500 $m^2/m^3$ to 750,000 $m^2/m^3$, and particularly preferably 10,000 $m^2/m^3$ to 700,000 $m^2/m^3$. The size and shape of the particles of composite material is fundamentally not specified. However, disk-shaped particles with a circular base surface, a diameter in the range of 1 cm to 10 cm, preferably 2 cm to 6 cm, and a thickness in the range of 2 mm to 20 mm, preferably 5 mm to 10 mm, have proved to be advantageous, whereby these disk-shaped particles may relatively have large hollow spaces.

5. Use of the Composite Material

The composite material according to the invention is particularly suitable as a carrier material for bacteria for use in the biological treatment stage of sewage treatment plants. It is typically used in a quantity corresponding to between 5% and 50% by volume, and preferably between 10% and 40% of the reaction vessel.

When the material is put into use, the carrier material may be inoculated with suitable bacteria, although this is not necessarily required.

The use of the composite material according to the invention is not restricted to sewage treatment plants. It is also suitable as a carrier for bacteria for other uses, such as bioreactors in the chemical industry, fermentation reactors in the food industry, etc. With these uses, it may be necessary to adapt to components to be used to the prevailing conditions and requirements with respect to stability, specific density, toxicity, etc. This adaptation may readily be carried out with the aid of routine experiments and may take place based upon the general specialist knowledge of the relevant person skilled in the art.

6. Manufacture of the Composite Material

The composite material according to the invention may be manufactured from the components by
(1) mixing the non-metallic inorganic material with the plastics particles;
(2) filling the mixture into the mould provided for it;
(3) melting the surface of the plastics particles; and possibly
(4) pressing together the melted plastics particles and the grains of the non-metallic inorganic material;

whereby step (4) may either be carried out simultaneously with step (3) or after step (3).

The melting in step (3) takes place by heating the plastics particles at a temperature above the melting point of the plastics over a period in the range of 5 min. to 60 min. Preferably, only the edge regions of the particles should be melted, such that the structure and form of the particles are maintained by its core. Slight deformation of the particles is not harmful, however.

The manufacturing process typically includes mixing of the non-metallic inorganic material with the plastics material, filling into a suitable sintering mould and possibly, pressing. Then follows the sintering of the mixture in the sintering device according to a predetermined sintering programme with the parameters of temperature and dwell time. During the dwell time in the sintering device, sintering of the plastics particles takes place, enclosing the non-metallic inorganic material.

In a preferred embodiment, the connection between the plastics particles and the non-metallic inorganic material is achieved using a plastics powder. The plastics powder may be added at any desired time point before the melting. Preferred grain sizes for the plastics powder are in the range of 0.2 mm to 1.5 mm, and particularly preferably in the range of 0.2 mm to 1.0 mm. Due to these small grain sizes, the melting and therefore the binding of the components is facilitated. The plastics powder therefore acts as a mediator.

A suitable material for the plastics powder is the material of the plastics particles, although similar materials may be used. To be understood as "similar materials" in this connection are those having a specific density in the range of 0.6 g/cm$^3$ to 1.2 g/cm$^3$, preferably 0.9 g/cm$^3$ to 1.1 g/cm$^3$. In addition, the melting point of the plastics powder should be similar to that of the plastics particles. Preferably, the melting point should lie not more than 10% above that of the plastics particles and not more than 30% below that of the plastics particles.

The quantity of plastics powder that is favourably to be used depends on the other materials used and may be determined by means of simple preliminary tests. In any event, the quantity of plastics powder should advantageously at least be high enough such that detachment of components from the composite material is prevented. On the other hand, it is not advantageous to increase the relative quantity of plastics powder so much that the quantity required for simple covering of all surfaces is exceeded.

7. Example

A composite material was manufactured by binding a ceramic material having the following properties.

Starting Materials:

Silicate material

Pore size: 0.1 µm to 100 µm

Material density: 2.2 g/cm$^3$

Porosity: 60%

Specific surface area: 350,000 m$^2$/m$^3$

Plastics Material:

HDPE

Density: 1.035 g/cm$^3$

Plastics Powder:

HDPE

Density: 0.951 g/cm$^3$

Softening temperature: 84° C. (Vicat B50 to ISO 306)

Process temperature: 230° C. Dwell time: 20 min.

Specific density: ca. 1 g/cm$^3$

Particle size: 20 mm to 50 mm

Specific surface area: ca. 175,000

The binding material was capable of becoming suspended in a sewage treatment plant medium and it was capable of colonisation by bacteria. During test operation of a treatment plant, it was found that the carriers colonised by bacteria were readily capable of regeneration, since bacteria and sludge could be removed from the carrier.

The invention claimed is:

1. Composite material with a specific density in the range of 0.8 g/cm$^3$ to 1.2 g/cm$^3$, comprising:
   one or more grains of a non-metallic inorganic material with a specific surface area in the range of 10,000 m$^2$/m$^3$ to 1,000,000 m$^2$/m$^3$, having a porosity in the range of 10% to 80% wherein at least 50% of the pores have a pore size in the range of 0.1 µm to 1000 µm, and wherein more than 50% of the grains have a grain size in the range of 0.1 mm to 50 mm; and
   one or more plastics particles with a specific density in the range of 0.6 g/cm$^3$ to 1.2 g/cm$^3$, and a specific surface area in the range of 50 m$^2$/m$^3$ to 1000 m$^2$/m$^3$, wherein more than 50% of the plastics particles have a particle size in the range of 0.01 mm to 100 mm.

2. The composite material according to claim 1, wherein the non-metallic inorganic material has a specific surface area in the range of 25,000 m$^2$/m$^3$ to 500,000 m$^2$/m$^3$.

3. The composite material according to claim 1, wherein the weight ratio of non-metallic inorganic material to plastics particles lies in the range of 15:85 to 85:15.

4. A method for manufacturing the composite material according to claim 1, comprising:
   mixing the grains of non-metallic inorganic material with the plastics particles;

filling the mixture into a mould; and
melting the surface of the plastics particles.

5. The method according to claim 4, further comprising adding an additional plastics powder having a grain size in the range of 0.2 mm to 1.5 mm, a specific density in the range of 0.6 g/cm$^3$ to 1.2 g/cm$^3$ and having a melting point not more than 10% above that of the plastics particles and not more than 30% below that of the plastics particles,
wherein the additional plastics powder is added before melting the surface of the plastics particles.

6. The method according to claim 4, comprising pressing together the plastics particles having a melted surface with the grains of the non-metallic inorganic material either simultaneously with or following melting the surface of the plastics particles.

7. A method of carrying bacteria comprising:
contacting the bacteria with the composite material according to claim 1, such that the composite material carries bacteria.

8. The method according to claim 7, wherein bacteria is carried in plants for water treatment.

9. The method according to claim 7, wherein the specific density of the composite material corresponds to the specific density of a surrounding material.

10. A method for the biological treatment of water, comprising treating water with a composite material according to claim 1, wherein the composite material carries bacteria.

11. The method according to claim 10, wherein the water is treated in a plant.

12. The method according to claim 10, wherein the water is treated in a sewage treatment plant, a bioreactor or a fermentation reactor.

13. The method according to claim 10, wherein the water is treated in a sewage treatment plant.

14. The method according to claim 10, wherein the specific density of the composite material corresponds to the specific density of a surrounding material.

* * * * *